US012683185B2

(12) United States Patent
Son et al.

(10) Patent No.: US 12,683,185 B2
(45) Date of Patent: Jul. 14, 2026

(54) INTEGRATED ALL-SOLID-STATE SECONDARY BATTERY

(71) Applicant: SEVEN KING ENERGY CO., LTD., Seongnam-si (KR)

(72) Inventors: Jung Woo Son, Changwon-si (KR); Ji Won Son, Changwon-si (KR); Hyun Ji Choi, Changwon-si (KR); Jae Kwang Kim, Changwon-si (KR)

(73) Assignee: SEVEN KING ENERGY CO., LTD., Seongnam-si (KR)

( * ) Notice: Subject to any disclaimer, the term of this patent is extended or adjusted under 35 U.S.C. 154(b) by 205 days.

(21) Appl. No.: 16/651,341

(22) PCT Filed: Sep. 27, 2018

(86) PCT No.: PCT/KR2018/011347
§ 371 (c)(1),
(2) Date: Mar. 26, 2020

(87) PCT Pub. No.: WO2019/066445
PCT Pub. Date: Apr. 4, 2019

(65) Prior Publication Data

US 2020/0274195 A1 Aug. 27, 2020

(30) Foreign Application Priority Data

Sep. 28, 2017 (KR) ........................ 10-2017-0125974

(51) Int. Cl.
*H01M 10/0562* (2010.01)
*H01M 4/02* (2006.01)
(Continued)

(52) U.S. Cl.
CPC ..... *H01M 10/0562* (2013.01); *H01M 4/1391* (2013.01); *H01M 4/1395* (2013.01);
(Continued)

(58) Field of Classification Search
CPC .. H01M 4/1391; H01M 4/1395; H01M 4/664; H01M 4/66; H01M 4/02;
(Continued)

(56) References Cited

U.S. PATENT DOCUMENTS

| | | | | |
|---|---|---|---|---|
| 2009/0155678 A1* | 6/2009 | Less | H01M 10/18 429/231.95 |
| 2014/0173889 A1* | 6/2014 | Johnson | C09D 5/4407 29/623.5 |

(Continued)

FOREIGN PATENT DOCUMENTS

| | | |
|---|---|---|
| CN | 1331847 A | 1/2002 |
| CN | 1452794 A | 10/2003 |

(Continued)

OTHER PUBLICATIONS

English translation of KR1020150037397A—Hydrid electrolyte, manufacturing method thereof, and flexible lithium ion battery comprising same, 2015, Postech academy-industry foundation (Year: 2015).*

(Continued)

*Primary Examiner* — Adam J Francis

(57) ABSTRACT

In order to improve the safety of a rechargeable battery, methods for manufacturing the rechargeable battery using a solid-state electrolyte are being studied. However, a process of manufacturing the all-solid state rechargeable battery by separately preparing and laminating an electrode and a solid-state electrolyte is not only complicated, but also may cause side reactions due to residual moisture between the electrode and the solid-state electrolyte. In addition, additional processes are required to reduce the interface resistance between the electrode and the solid-state electrolyte. In order to solve these disadvantages, the present invention is to manufacture an integral all-solid state rechargeable battery by applying a mixed slurry of a conductive ceramic
(Continued)

material and a polymer mixed with a solvent onto an electrode, evaporating the solvent, absorbing a liquid electrolyte, and then covering the electrode with a counter electrode. The manufacturing method of the integral all-solid state rechargeable battery has an effect of simplifying the manufacturing steps, suppressing side reactions, and reducing the interface resistance between the electrode and the solid-state electrolyte.

15 Claims, 8 Drawing Sheets

(51) Int. Cl.

| | |
|---|---|
| ***H01M 4/1391*** | (2010.01) |
| ***H01M 4/1395*** | (2010.01) |
| ***H01M 4/66*** | (2006.01) |
| ***H01M 10/0525*** | (2010.01) |
| ***H01M 10/0569*** | (2010.01) |

(52) U.S. Cl.
CPC ....... *H01M 4/664* (2013.01); *H01M 10/0525* (2013.01); *H01M 10/0569* (2013.01); *H01M 2004/028* (2013.01)

(58) Field of Classification Search
CPC ......... H01M 10/0562; H01M 10/0525; H01M 10/0569; H01M 10/056; H01M 2004/028
See application file for complete search history.

(56) References Cited

U.S. PATENT DOCUMENTS

| | | | | |
|---|---|---|---|---|
| 2015/0056489 | A1* | 2/2015 | Babinec | H01M 50/46<br>429/144 |
| 2015/0288030 | A1* | 10/2015 | Yoo | H01M 10/0569<br>429/188 |
| 2017/0187063 | A1* | 6/2017 | Pistorino | H01M 10/056 |
| 2020/0176808 | A1* | 6/2020 | Schneider | H01M 4/364 |

FOREIGN PATENT DOCUMENTS

| | | | | | |
|---|---|---|---|---|---|
| CN | 102244292 | A | | 11/2011 | |
| CN | 102388483 | A | | 3/2012 | |
| CN | 103367798 | A | | 10/2013 | |
| JP | H11144767 | A | * | 5/1999 | |
| JP | 2002-543554 | | | 12/2002 | |
| JP | 2009-529762 | | | 8/2009 | |
| JP | 2009-529762 | A | | 8/2009 | |
| JP | 2013-062228 | | | 4/2013 | |
| JP | 2013062228 | A | * | 4/2013 | |
| JP | 2016-018606 | A | | 2/2016 | |
| JP | 2016-040767 | A | | 3/2016 | |
| JP | 2016-100077 | | | 5/2016 | |
| JP | 2016-184496 | | | 10/2016 | |
| JP | 2016-184496 | A | | 10/2016 | |
| JP | 2016-201310 | A | | 12/2016 | |
| JP | 2016-219130 | A | | 12/2016 | |
| JP | 2016-219411 | | | 12/2016 | |
| JP | 2016-219411 | A | | 12/2016 | |
| JP | 2017-054792 | | | 3/2017 | |
| KR | 10-2000-0041209 | A | | 7/2000 | |
| KR | 10-2015-0032089 | A | | 3/2015 | |
| KR | 2015-0037397 | A | | 4/2015 | |
| KR | 1020150037397 | A | * | 4/2015 | H01M 10/0525 |
| KR | 10-2015-0143365 | A | | 12/2015 | |
| KR | 10-2017-0024862 | A | | 3/2017 | |
| KR | 10-2017-0076246 | A | | 7/2017 | |
| KR | 20170076246 | A | * | 7/2017 | |
| KR | 10-2017-0092264 | A | | 8/2017 | |
| WO | 2012-077197 | A1 | | 6/2012 | |

OTHER PUBLICATIONS

International Search Report for PCT/KR2018/011347, mailed Dec. 31, 2018, and its English translation.
Extended European Search Report mailed May 6, 2021 for European Application No. 18860646.1.
Japanese Office Action mailed Sep. 21, 2021 for Japanese Application No. 2020-517457.
Japanese Office Action mailed Feb. 22, 2022 for Japanese Application No. 2020-517457.
Tina Nestler et al, "Separators-Technology review: Ceramic based separators for secondary batteries", AIP Conference Proceedings, vol. 1597, Feb. 17, 2015, pp. 155-184, XP055565434, New York, U.S.
Min Kim et al., "Electrochemical performances of inorganic membrane coated electrodes for li-ion batteries", Journal of Solid State Electrochemistry; Current Research and Development in Science and Technology, Springer, Berlin, DE, vol. 14, No. 5, May 5, 2009, pp. 769-773, XP019762811.

* cited by examiner

INTEGRATED ALL-SOLID-STATE SECONDARY BATTERY

CROSS-REFERENCE TO RELATED APPLICATIONS

This application is a 371 national phase entry of International Application No. PCT/KR2018/011347, filed on Sep. 27, 2018, which claims the benefit of and priority to Korean Patent Application No. 10-2017-0125974, filed on Sep. 28, 2017, the disclosures of which are herein incorporated by reference in their entirety.

TECHNICAL FIELD

The present invention relates to an integral all-solid state rechargeable battery and a manufacturing method thereof, which is manufactured by applying a mixed slurry containing a conductive ceramic material, a polymer, and a solvent onto an electrode, drying the solvent, and then absorbing a liquid electrolyte, wherein the electrode and a solid electrolyte are integrated.

BACKGROUND ART

In the related art, a rechargeable battery has been manufactured by separately preparing units required for the rechargeable battery such as an electrode, an electrolyte, and a separator and then laminating the units to make one. The all-solid state rechargeable battery has been manufactured in the same manner as in the conventional method, in which a solid-state electrolyte was prepared in an independent process and then laminated with an electrode. In the conventional method, since the electrode and the solid-state electrolyte are separately prepared and then laminated, there is a problem in that the interface resistance between the electrode and the solid-state electrolyte increases. Therefore, in order to reduce the interface resistance between the electrode and the solid-state electrolyte, additional units such as a buffer layer containing a polymer and a conductive ceramic material and additional processes were required. In addition, the conventional solid-state electrolyte has a problem in that the ionic conductivity is low at room temperature and the interface resistance with the electrode is high, resulting in low battery characteristics.

DISCLOSURE

Technical Problem

The present invention is to simplify a manufacturing process of an all-solid state rechargeable battery by solving the problems in the conventional manufacturing process of the all-solid state rechargeable battery. According to the present invention, it is possible to reduce the manufacturing cost of the all-solid-state rechargeable battery. The present invention may also improve characteristics of the all-solid state rechargeable battery.

The present invention is also to provide a new solid electrolyte that solves the problems of the conventional solid-state electrolyte.

Technical Solution

A rechargeable battery is manufactured by separately preparing and laminating respective units (electrodes, electrolytes, separators, etc.) included in the battery. The all-solid state rechargeable battery was also manufactured in the same manner as in the conventional method, in which a solid-state electrolyte was prepared in an independent process and then laminated with an electrode. This process is complex. In addition, the time for which the solid-state electrolyte is exposed to moisture in the air is long. In addition, since the electrode and the solid-state electrolyte are separately prepared and mechanically laminated, the interface resistance increases. As a result, an additional process is required to reduce the interface resistance.

The present invention makes it possible to simplify the manufacturing process of an all-solid state battery by applying a mixed slurry containing a conductive ceramic material, a polymer, and a solvent onto an electrode and then evaporating the solvent. In addition, it is possible to reduce side reactions in the rechargeable battery by reducing the time for which constituent materials serving as electrolytes are exposed to moisture in the air. The present invention prepares a solid-state electrolyte by absorbing a liquid electrolyte in a composite film containing the ceramic material and the polymer after the solvent is evaporated. According to the present invention, it is possible to effectively reduce the interface resistance between the electrode and the electrolyte without additional processes such as forming a buffer layer.

Advantageous Effects

According to the present invention, it is possible to reduce manufacturing costs by simplifying the manufacturing process of the all-solid state rechargeable battery. Further, it is also possible to improve characteristics of the rechargeable battery such as interface resistance.

EMBODIMENTS OF THE INVENTION

Figure 1:
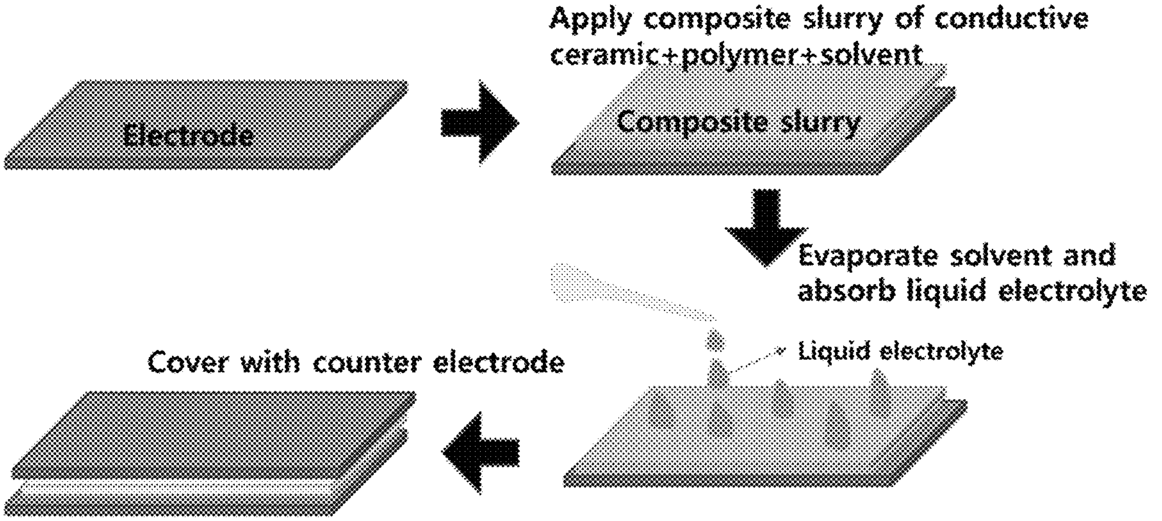
FIG. 1 is a schematic view of a manufacturing process of an integral all-solid state rechargeable battery.

Specific aspects of the present invention are as follows.

1. A method for manufacturing an integral all-solid state rechargeable battery by applying a mixed slurry containing a conductive ceramic material, a polymer, and a solvent onto one of electrodes, drying the mixed slurry to remove the solvent, resulting in a composite film containing the conductive ceramic material and the polymer, absorbing a liquid electrolyte in the composite film, and covering the electrode with a counter electrode.

2. A method for manufacturing an integral all-solid state rechargeable battery by applying a first mixed slurry containing a conductive ceramic material, a polymer, and a solvent onto one of electrodes, drying the first mixed slurry to remove the solvent, resulting in a first composite film containing the conductive ceramic material and the polymer, applying a second mixed slurry, different from the first mixed slurry, containing a conductive ceramic material, a polymer, and a solvent onto the first composite film, drying the second mixed slurry to remove the solvent, resulting in a multilayered composite film consists of the first composite film and a second composite film containing the conductive ceramic material and the polymer, absorbing a liquid electrolyte in the multilayered composite film, and covering the electrode with a counter electrode.

3. A method for manufacturing an integral all-solid state rechargeable battery by preparing a positive electrode unit in which a positive electrode and a first solid electrolyte are integrated, simultaneously or sequentially preparing a negative electrode unit in which a negative electrode and a second solid electrolyte are integrated, and attaching the positive electrode unit and the negative electrode unit, wherein the positive electrode unit is prepared by applying a first mixed slurry containing a conductive ceramic material, a polymer, and a solvent onto the positive electrode, drying the first mixed slurry to remove the solvent, resulting in a first composite film containing the conductive ceramic material and the polymer, and absorbing a liquid electrolyte in the first composite film, the negative electrode unit is prepared by applying a second mixed slurry containing a conductive ceramic material, a polymer, and a solvent onto the negative electrode, drying the second mixed slurry to remove the solvent, resulting in a second composite film containing the conductive ceramic material and the polymer, and absorbing a liquid electrolyte in the second composite film.

4. The method for manufacturing the integral all-solid state rechargeable battery according to claim 2, wherein the multilayered composite film further includes a composite film different from the first composite film and the second composite film.

5. The method for manufacturing the integral all-solid state rechargeable battery according to claim 3, wherein one or both of the positive electrode unit and the negative electrode unit further includes a composite film different from the first composite film and the second composite film.

6. The method for manufacturing the integral all-solid state rechargeable battery according to any one of claims 1 to 5, wherein an amount of the conductive ceramic material in the mixed slurry is 40 wt % to 99 wt % when a sum of the conductive ceramic material and the polymer is set to 100 wt %.

7. The method for manufacturing the integral all-solid state rechargeable battery according to any one of claims 1 to 5, wherein an amount of the polymer in the mixed slurry is 1 wt % to 60 wt % when a sum of the conductive ceramic material and the polymer is set to 100 wt %.

8. The method for manufacturing the integral all-solid state rechargeable battery according to any one of claims 1 to 7, wherein an amount of the liquid electrolyte absorbed in the composite film is 1 to 40 parts by weight with respect to 100 parts by weight of the composite film containing the conductive ceramic material and the polymer.

9. The method for manufacturing the integral all-solid state rechargeable battery according to any one of claims 1 to 8, wherein the solvent used in the mixed slurry containing the conductive ceramic material, the polymer, and the solvent is N-methyl-2-pyrrolidone (NMP)-based one or derivative thereof, acetone-based one or derivative thereof, alcohol-based one or derivative thereof, methanol-based one or derivative thereof, dimethylacetamide (DMAc)-based one or derivative thereof, tetrahydrofuran (THF)-based one or derivative thereof, dimethylformamide (DMF)-based one or derivative thereof, distilled water, or a mixture thereof 10. The method for manufacturing the integral all-solid state rechargeable battery according to any one of claims 1 to 9, wherein the liquid electrolyte is prepared by dissolving a lithium salt or a sodium salt in a non-aqueous organic solvent, an ionic liquid solvent, or a mixture thereof.

11. The method for manufacturing the integral all-solid state rechargeable battery according to claim 10, wherein the non-aqueous organic solvent is carbonate-based one, ester-based one, ether-based one, ketone-based one, alcohol-based one, aprotic solvent, or a combination thereof.

12. The method for manufacturing the integral all-solid state rechargeable battery according to claim 10, wherein the ionic liquid solvent is imidazolium-based one, pyridinium-based one, pyrrolidinium-based one, sulfonium-based one, pyrazolium-based one, ammonium-based one, morpholinium-based one, phospholinium-based one, piperidinium-based one, or a combination thereof 13. The method for manufacturing the integral all-solid state rechargeable battery according to claim 10, wherein the lithium salt is $LiClO_4$, $LiPF_6$, $CF_3SO_2NLiSO_2CF_3$ (LiTFSI), $Li[N(SO_2F)_2]$ (LiFSI), $Li[B(C_2O_4)_2]$ (LiBOB), $LiAsF_6$, lithium fluorosulfonyl-trifluoromethanesulfonylimide (LiFTFSI), or a combination thereof.

14. The method for manufacturing the integral all-solid state rechargeable battery according to claim 10, wherein the sodium salt is $NaClO_4$, $NaPF_4$, $NaPF_6$, $NaAsF_6$, NaTFSI, $Na[(C_2F_5)_3PF_3]$ (NaFAP), $Na[B(C_2O_4)_2]$ (NaBOB), $Na[N(SO_2F)_2]$ (NaFSI), NaBeti ($NaN[SO_2C_2F_5]_2$), or a combination thereof.

15. The method for manufacturing the integral all-solid state rechargeable battery according to any one of claims 1 to 5, wherein the conductive ceramic material is lithium oxide-based one, lithium sulfide-based one, lithium phosphate-based one, amorphous ionic conductive material, NASICON, sodium sulfide-based one, or sodium oxide-based one.

16. The method for manufacturing the integral all-solid state rechargeable battery according to claim 15, wherein the lithium oxide-based conductive ceramic material is Li-β-$Al_2O_3$, Li—$TiO_2$, Li—$BaTiO_3$, Li—$SiO_2$, $(La,Li)TiO_3$ (LLTO) ((La,Li)═La or Li), $Li_5La_3Ta_2O_{12}$, $Li_6La_2CaTa_2O_{12}$, $Li_4SiO_4$ $Li_3BO_{2.5}N_{0.5}$, $Li_9SiAlO_8$, $Li_6La_2ANb_2O_{12}$ (A=Ca or Sr), $Li_2Nd_3TeSbO_{12}$, $Li_7La_3Zr_2O_{12}$ (LLZO), $Li_5La_3Ta_2O_{12}$, $Al_2O_3$, or $Li_9SiAlO_8$.

17. The method for manufacturing the integral all-solid state rechargeable battery according to claim 15, wherein the lithium sulfide-based conductive ceramic material is $Li_{10}GeP_2S_{12}$, $Li_7P_2S_{11}$,$Li_{3.25}Ge_{0.25}P_{0.75}S_4$ (LGPS), $Li_2S$—$Si_2S_5$, $Li_2S$—$Ga_2S_3$—$GeS_2$, $Li_2S$—$Sb_2S_3$—$GeS_2$, $Li_2S$—$P_2S_5$ $Li_2S$—$P_2S_5$—$Li_4SiO_4$, or $Li_{3.25}$—$Ge_{0.25}$—$P_{0.75}S_4$ (Thio- LISICON).

18. The method for manufacturing the integral all-solid state rechargeable battery according to claim 15, wherein the lithium phosphate-based conductive ceramic material is LAGP ($Li_{1+x}Al_xGe_{2-x}(PO_4)_3$) ($0<x<2$), LTAP ($Li_{1+x}Ti_{2-x}Al_x(PO_4)_3$) ($0<x<2$), $Li_{1+x}Ti_{2-x}Al_xSi_y(PO_4)_{3-y}$ ($0<x<2$, $0<y<3$), $LiAl_xZr_{2-x}(PO_4)_3$ ($0<x<2$), or $LiTi_xZr_{2-x}(PO_4)_3$ ($0<x<2$).

19. The method for manufacturing the integral all-solid state rechargeable battery according to claim 15, wherein the amorphous ionic conductive material is phosphorous-based glass, oxide-based glass, or oxide-sulfide based glass.

20. The method for manufacturing the integral all-solid state rechargeable battery according to claim 15, wherein the sodium oxide-based conductive ceramic material is $Na_3Zr_2Si_2PO_{12}$.

21. The method for manufacturing the integral all-solid state rechargeable battery according to any one of claims 1 to 20, wherein the polymer is polyvinylidene fluoride (PVdF)-based one or copolymer thereof, poly[(vinylidene fluoride-co-trifluoroethylene]-based one or copolymer thereof, polyethylene glycol (PEO)-based one or copolymer thereof, polyacrylonitrile (PAN)-based one or copolymer thereof, poly(methylmethacrylate) (PMMA)-based one or copolymer thereof, polyvinyl chloride-based one or copolymer thereof, polyvinylpyrrolidone (PVP)-based one or copolymer thereof, polyimide (PI)-based one or copolymer thereof, polyethylene (PE)-based one or copolymer thereof, polyurethane (PU)-based one or copolymer thereof, polypropylene (PP)-based one or copolymer thereof, poly(propylene oxide) (PPO)-based one or copolymer thereof, poly(ethyleneimine) (PEI)-based one or copolymer thereof, poly(ethylene sulfide) (PES)-based one or copolymer thereof, poly(vinyl acetate) (PVAc)-based one or copolymer thereof, poly(ethylene succinate) (PESc)-based one or copolymer thereof, polyester-based one or copolymer thereof, polyamine-based one or copolymer thereof, polysulfide-based one or copolymer thereof, siloxane-based one or copolymer thereof, styrene-butadiene rubber (SBR)-based one or copolymer thereof, carboxymethylcellulose (CMC)-based one or copolymer thereof, a derivative thereof, or a combination thereof.

22. A method for manufacturing a packed integral all-solid state rechargeable battery by compressing and packing the integral all-solid state rechargeable battery according to any one of claims 1 to 21.

23. An integral all-solid state rechargeable battery manufactured by the method according to any one of claims 1 to 22.

24. A packed integral all-solid state rechargeable battery manufactured by compressing and packing the integral all-solid state rechargeable battery manufactured by the method according to any one of claims 1 to 23.

25. The integral all-solid state rechargeable battery according to claim 23, wherein a thickness of a solid electrolyte between a positive electrode and a negative electrode is 20 μm to 150 μm.

26. The integral all-solid state rechargeable battery according to claim 24, wherein a thickness of a solid electrolyte between the positive electrode and the negative electrode is 20 μm to 150 μm.

The present invention will be described in more detail.

When the sum of the conductive ceramic material and the polymer is set to 100 wt %, the conductive ceramic material may be 40 wt % to 99 wt %, and the polymer may be 1 wt % to 60 wt %. The conductive ceramic material may be preferably 60 wt % to 99 wt %, more preferably 70 wt % to 99 wt %, much more preferably 80 wt % to 99 wt %, and very much more preferably 90 wt % to 99 wt %. The conductive ceramic material may be more preferably 60 wt % to 90 wt % and much more preferably 70 wt % to 80 wt %. The polymer may be 1 wt % to 40 wt %, 1 wt % to 30 wt %, 1 wt % to 20 wt %, or 1 wt % to 10 wt %. The polymer is more preferably 10 wt % to 40 wt % and much more preferably 20 wt % to 30 wt %.

The liquid electrolyte is 1 to 40 parts by weight, preferably 10 to 40 parts by weight, more preferably 10 to 30 parts by weight, and much more preferably 10 to 20 parts by weight with respect to 100 parts by weight of the composite film containing the conductive ceramic material and the polymer.

The solvent used in the mixed slurry containing the conductive ceramic material, the polymer, and the solvent is N-methyl-2-pyrrolidone (NMP)-based one or derivative thereof, acetone-based one or derivative thereof, alcohol-based one or derivative thereof, methanol-based one or derivative thereof, dimethylacetamide (DMAc)-based one or derivative thereof, tetrahydrofuran (THF)-based one or derivative thereof, dimethylformamide (DMF)-based one or derivative thereof, distilled water, or mixture thereof.

The conductive ceramic material may be a lithium oxide-based one having a crystal structure containing oxygen, such as Li-β-$Al_2O_3$, Li—$TiO_2$, Li—$BaTiO_3$, Li—$SiO_2$, $(La,Li)TiO_3$ (LLTO) ((La,Li)═La or Li), $Li_5La_3Ta_2O_{12}$, $Li_6La_2CaTa_2O_{12}$, $Li_4SiO_4$ $Li_3BO_{2.5}N_{0.5}$, $Li_9SiAlO_8$, $Li_6La_2ANb_2O_{12}$ (A=Ca or Sr), $Li_2Nd_3TeSbO_{12}$, $Li_7La_3Zr_2O_{12}$ (LLZO), $Li_5La_3Ta_2O_{12}$, $Al_2O_3$, and $Li_9SiAlO_8$; a lithium sulfide-based one having a crystal structure containing sulfur, such as $Li_{10}GeP_2S_{12}$, $Li_7P_2S_{11}$, $Li_{3.25}Ge_{0.25}P_{0.75}S_4$ (LGPS), $Li_2S$—$Si_2S_5$, $Li_2S$—$Ga_2S_3$—$GeS_2$, $Li_2S$—$Sb_2S_3$—$GeS_2$, $Li_2S$—$P_2S_5$, $Li_2S$—$P_2S_5$—$Li_4SiO_4$, and $Li_{3.25}$—$Ge_{0.25}$—$P_{0.75}$ $S_4$ (Thio-LISICON); a lithium phosphate-based one having a crystal structure containing phosphorus, such as LAGP ($Li_{+x}Al_xGe_{2-x}(PO_4)_3$) ($0<x<2$, preferably $0<x<1$), LTAP ($Li_{1+x}Ti_{2-x}Al_x(PO_4)_3$) ($0<x<2$, preferably $0<x<1$), $Li_{1+x}Ti_{2-x}Al_xSi_y(PO_4)_{3-y}$ ($0<x<2$ and $0<y<3$, preferably $0<x<1$ and $0<y<1$), $LiAl_xZr_{2-x}(PO_4)_3$ ($0<x<2$, preferably $0<x<1$), and $LiTi_xZr_{2-x}(PO_4)_3$ ($0<x<2$, preferably $0<x<1$); an amorphous ionic conductive material such as phosphorous-based glass, oxide-based glass, and oxide-sulfide based glass; NASICON; sodium sulfide-based one; or sodium oxide-based one such as $Na_3Zr_2Si_2PO_{12}$.

The polymer may be polyvinylidene fluoride (PVdF)-based one or copolymer thereof, poly[(vinylidene fluoride-co-trifluoroethylene]-based one or copolymer thereof, polyethylene glycol (PEO)-based one or copolymer thereof, polyacrylonitrile (PAN)-based one or copolymer thereof, poly(methylmethacrylate) (PMMA)-based one or copolymer thereof, polyvinyl chloride-based one or copolymer thereof, polyvinylpyrrolidone (PVP)-based one or copolymer thereof, polyimide (PI)-based one or copolymer thereof, polyethylene (PE)-based one or copolymer thereof, polyurethane (PU)-based one or copolymer thereof, polypropylene (PP)-based one or copolymer thereof, poly(propylene oxide) (PPO)-based one or copolymer thereof, poly(ethyleneimine) (PEI)-based one or copolymer thereof, poly(ethylene sulfide) (PES)-based one or copolymer thereof, poly(vinyl acetate) (PVAc)-based one or copolymer thereof, poly(ethylene succinate) (PESc)-based one or copolymer thereof, polyester-based one or copolymer thereof, polyamine-based one or copolymer thereof, polysulfide-based one or copolymer thereof, siloxane-based one or copolymer thereof, styrene-butadiene rubber (SBR)-based one or copolymer thereof, carboxymethylcellulose (CMC)-based one or copolymer thereof, a derivative thereof, or a combination thereof. The polymer may be a mixture of the materials described above.

The liquid electrolyte may be prepared by dissolving a lithium salt or a sodium salt in a non-aqueous organic solvent, an ionic liquid solvent, or a mixture thereof, but is not limited thereto and may include all kinds of liquid electrolytes to be commonly used in the art. The non-aqueous organic solvent may be carbonate-based one, ester-based one, ether-based one, ketone-based one, alcohol-based one, an aprotic solvent, or a combination thereof. The ionic liquid solvent may be imidazolium-based one, pyridinium-based one, pyrrolidinium-based one, sulfonium-based one, pyrazolium-based one, ammonium-based one, morpholinium-based one, phospholinium-based one, piperidinium-based one, or a combination thereof. The structures of the ionic liquid cations are as follows.

The lithium salt used in the liquid electrolyte may be $LiClO_4$, $LiPF_6$, $CF_3SO_2NLiSO_2CF_3$ (LiTFSI), $Li[N(SO_2F)_2]$ (LiFSI), $Li[B(C_2O_4)_2]$ (LiBOB), $LiAsF_6$, lithium fluorosulfonyl-trifluoromethanesulfonylimide (LiFTFSI), or a combination thereof.

The sodium salt used in the liquid electrolyte may be $NaClO_4$, $NaPF_4$, $NaPF_6$, $NaAsF_6$, NaTFSI, $Na[(C_2F_5)_3PF_3]$ (NaFAP), $Na[B(C_2O_4)_2]$ (NaBOB), $Na[N(SO_2F)_2]$ (NaFSI), NaBeti ($NaN[SO_2C_2F_5]_2$), or a combination thereof.

When the all-solid state rechargeable battery includes the multilayered composite film, the composite film formed on the positive electrode uses composite films having relatively excellent electrical stability and properties at the positive electrode, and the composite film formed on the negative electrode uses composite films having relatively excellent electrical stability and properties at the negative electrode.

The composite film formed on the positive electrode may use a ceramic material having good ion conductivity. Lithium oxide-based, lithium phosphate-based, and lithium sulfide-based composite films, and the like may be used. The use of ceramic materials with good ionic conductivity increases the electrochemical characteristics of the composite film. It is preferable to use a ceramic material having conductivity of $10^{-3}$ S/cm or more in the composite film formed on the positive electrode. For example, LTAP ($Li_{1+x}Ti_{2-x}Al_x(PO_4)_3$) ($0<x<2$), LAGP ($Li_{1+x}Al_xGe_{2-x}(PO_4)_3$) ($0<x<2$), and LLTO ($Li_{3x}La_{2/3-x}TiO_3$) ($0<x<2/3$) may be used as the ceramic material. In addition, $Li_2S$—$P_2S_5$, $Li_2O$—$SiO_2$, $Li_7La_3Zr_2O_{12}$ (LLZO), Li-β-$Al_2O_3$, and $Li_{3.25}Ge_{0.25}P_{0.75}S_4$ (LGPS) may be used as the ceramic material of the composite film formed on the positive electrode.

The composite film formed on the negative electrode may use a ceramic material, such as a garnet such as $Al_2O_3$, $Li_6La_2BaTa_2O_{12}$, and LLZO ($Li_7La_3Zr_2O_{12}$) and a composite such as LiX—$Al_2O_3$ (X may be I and N). The ceramic material used in the composite film formed on the negative electrode varies according to a type of negative electrode used in the rechargeable battery. For example, when lithium is used as the negative electrode, it is preferred that ceramics containing Ti, Si, S, or Ge are not used. When graphite (carbon), silicon, or germanium is used as the negative electrode, it is preferred that ceramics containing Ti or S are not used. In addition, β-$Al_2O_3$, $Li_2O$—$SiO_2$, $Li_{3.25}Ge_{0.25}P_{0.75}S_4$ (LGPS), and LAGP ($Li_{1+x}Al_xGe_{2-x}(PO_4)_3$) ($0<x<2$) may be used as the ceramic material of the composite film formed on the negative electrode.

The polymer used in the composite film formed on the positive electrode may be polyvinylidene fluoride (PVdF)-based one or copolymer thereof, poly[(vinylidene fluoride-co-trifluoroethylene]-based one or copolymer thereof, polyethylene glycol (PEO)-based one or copolymer thereof, polyacrylonitrile (PAN)-based one or copolymer thereof, poly(methylmethacrylate) (PMMA)-based one or copo-

| | | | | | | | |
|---|---|---|---|---|---|---|---|
| Structure of Cation | 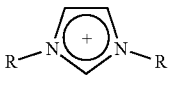 | 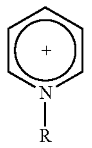 | 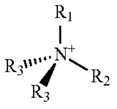 | 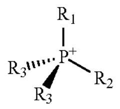 | 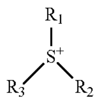 | 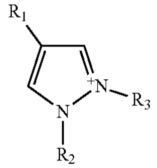 | 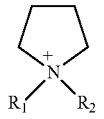 |
| Name of Structure | imidazolium ion | pyridinium ion | ammonium ion | phosphonium ion | sulfonium ion | pyrazolium ion | pyrrolidium ion |

lymes thereof, polyvinyl chloride-based one or copolymer thereof, polyvinylpyrrolidone (PVP)-based one or copolymer thereof, polyimide (PI)-based one or copolymer thereof, polyethylene (PE)-based one or copolymer thereof, polyurethane (PU)-based one or copolymer thereof, polypropylene (PP)-based one or copolymer thereof, poly(propylene oxide) (PPO)-based one or copolymer thereof, poly(ethyleneimine) (PEI)-based one or copolymer thereof, poly(ethylene sulfide) (PES)-based one or copolymer thereof, poly(vinyl acetate) (PVAc)-based one or copolymer thereof, poly(ethylene succinate) (PESc)-based one or copolymer thereof, polyester-based one or opolymers thereof, polyamine-based one or copolymer thereof, polysulfide-based one or copolymer thereof, siloxane-based one or copolymer thereof, styrene-butadiene rubber (SBR)-based one or copolymer thereof, carboxymethylcellulose (CMC)-based one or copolymer thereof, a derivative thereof, or a combination thereof.

When a charging voltage is set to 4.4 V or more, it is preferred to use polyvinylidene fluoride (PVdF)-based one or copolymer thereof. In addition, it is preferred to use a polyacrylonitrile (PAN)-based one or copolymer thereof as the polymer used in the composite film formed on the positive electrode.

The polymer used in the composite film formed on the negative electrode may use the polymers used in the composite film formed on the positive electrode. It is preferred to use polyacrylonitrile (PAN)-based one or copolymer thereof or polyurethane (PU)-based one or copolymer thereof having excellent strength and electrochemical stability. In addition, styrene butadiene rubber (SBR)-based one or copolymer thereof, and carboxymethyl cellulose (CMC)-based one or copolymer thereof may be used as the polymer of the composite film formed on the negative electrode.

The multilayered composite film may be prepared by using polyvinylidene fluoride (PVdF)-based one or copolymer thereof as the polymer of the composite film formed on the positive electrode, a ceramic material selected from lithium phosphate-based one, lithium oxide-based one, lithium sulfide-based one, and a mixture thereof as the ceramic material of the composite film formed on the positive electrode, polyvinylidene fluoride (PVdF)-based one or copolymer thereof as the polymer of the composite film formed on the negative electrode, and a lithium phosphate-based ceramic material as the ceramic material of the composite film formed on the negative electrode.

The multilayered composite film may be prepared by using polyvinylidene fluoride (PVdF) as the polymer of the composite film formed on the positive electrode, a ceramic material selected from LTAP ($Li_{1+x}Ti_{2-x}Al_x(PO_4)_3$) ($0<x<2$), LLZO ($Li_7La_3Zr_2O_{12}$), $Li_2S—P_2S_5$, and a mixture thereof as the ceramic material of the composite film formed on the positive electrode, PVdF as the polymer of the composite film formed on the negative electrode, and LAGP ($Li_{1+x}Al_xGe_{2-x}(PO_4)_3$) ($0<x<2$) as the ceramic material of the composite film formed on the negative electrode. The multilayered composite film may be prepared by using polyvinylidene fluoride (PVdF)-based one or copolymer thereof as the polymer of the composite film formed on the positive electrode, a ceramic material selected from lithium phosphate-based one, lithium oxide-based one, lithium sulfide-based one, and a mixture thereof as the ceramic material of the composite film formed on the positive electrode, polyvinylidene fluoride (PVdF)-based one or copolymer thereof as the polymer of the composite film formed on the negative electrode, and a lithium oxide-based one as the ceramic material of the composite film formed on the negative electrode.

The multilayered composite film may be prepared by using polyvinylidene fluoride (PVdF), polyvinylidene fluoride-trifluoroethylene (PVdF-TrFE), or a mixture thereof as the polymer of the composite film formed on the positive electrode, a ceramic material selected from LTAP ($Li_{1+x}Ti_{2-x}Al_x(PO_4)_3$) ($0<x<2$), LLTO ($(La,Li)TiO_3$), $Li_2S—P_2S_5$, and a mixture thereof as the ceramic material of the composite film formed on the positive electrode, polyvinylidene fluoride (PVdF), polyvinylidene fluoride-trifluoroethylene (PVdF-TrFE), or a mixture thereof as the polymer of the composite film formed on the negative electrode, and a ceramic material selected from $Al_2O_3$, $\beta$-$Al_2O_3$, LLZO ($Li_7La_3Zr_2O_{12}$), and a mixture thereof as the ceramic material of the composite film formed on the negative electrode.

The multilayered composite film may be prepared by using polyacrylonitrile (PAN)-based one or a copolymer thereof as the polymer of the composite film formed on the positive electrode, a ceramic material selected from lithium phosphate-based one, lithium oxide-based one, lithium sulfide-based one, and a mixture thereof as the ceramic material of the composite film formed on the positive electrode, polyacrylonitrile (PAN)-based one or a copolymer thereof as the polymer of the composite film formed on the negative electrode, and a lithium sulfide-based one as the ceramic material of the composite film formed on the negative electrode.

The multilayered composite film may be prepared by using polyacrylonitrile (PAN) as the polymer of the composite film formed on the positive electrode, a ceramic material selected from LTAP ($Li_{1+x}Ti_{2-x}Al_x(PO_4)_3$) ($0<x<2$), LLZO ($Li_7La_3Zr_2O_{12}$), $Li_2S—P_2S_5$, and a mixture thereof as the ceramic material of the composite film formed on the positive electrode, polyacrylonitrile (PAN) as the polymer of the composite film formed on the negative electrode, and a ceramic material selected from LGPS ($Li_{3.25}Ge_{0.25}P_{0.75}S_4$), $Li_2O—SiO_2$, and a mixture thereof as the ceramic material of the composite film formed on the negative electrode.

In the all-solid state electrolyte, lithium or sodium ions move through three paths as follows. Among the paths, (1) is a main moving path.

(1) Movement through contacting ceramics (pumping movement)
(2) Movement through liquid electrolyte
(3) Movement across ceramic material and liquid electrolyte

SPECIFIC EMBODIMENTS

Specific embodiments of the present invention will be described in detail. Specific embodiments are presented as examples of the present invention, and the present invention is not limited thereto. The scope of the present invention is only defined by claims to be described below.

The present invention is to manufacture an integral all-solid state rechargeable battery more simply than the conventional method by applying a mixed slurry containing a conductive ceramic material, a polymer, and a solvent onto an electrode, evaporating the solvent, absorbing a liquid electrolyte, and then covering the electrode with a counter electrode.

The method of absorbing the liquid electrolyte includes impregnation, dripping, and pouring, but is not limited thereto.

The method of applying the mixed slurry onto the electrode includes a printing method, a doctor blade method, a spin coating method, a spray coating method, and the like.

The mixed slurry is prepared by mixing 75 wt % or more of the conductive ceramic material with 25 wt % or less of the polymer in an N-methyl-2-pyrrolidone (NMP) solvent. The slurry is applied flatly onto the electrode by a printing method, a doctor blade method, a spin coating method, a spray coating method, or the like and then dried to remove the solvent completely. After removing the solvent from the composite film, 20 wt % of the liquid electrolyte is absorbed in the composite film. The all-solid state rechargeable battery is manufactured by using $LiNi_{0.6}Co_{0.2}Mn_{0.2}O_2$ as the positive electrode and graphite as the negative electrode.

FIG. 1 is a schematic view of a process of manufacturing an integral all-solid state rechargeable battery according to an exemplary embodiment of the present invention.

Figure 2:
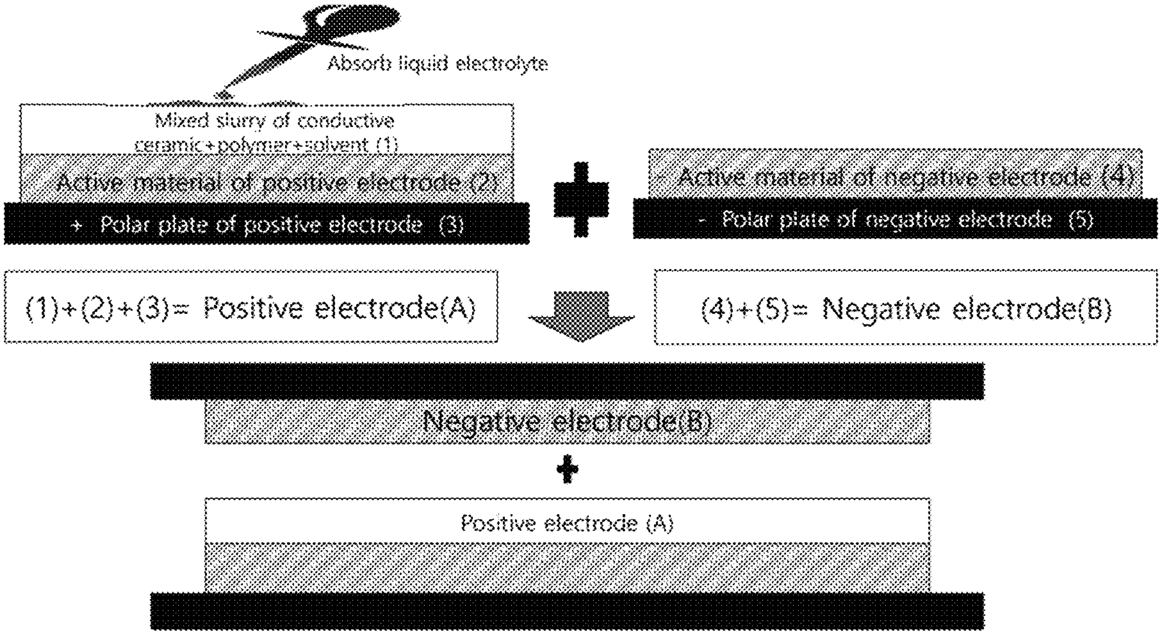
FIG. 2 is a schematic view of an integral all-solid state rechargeable battery manufactured by applying a mixed slurry containing a conductive ceramic material, a polymer, and a solvent onto a positive electrode, drying the mixed slurry to remove the solvent, resulting in a composite film containing the conductive ceramic material and the polymer, absorbing a liquid electrolyte in the composite film, and covering the positive electrode with a negative electrode.

FIG. 2 is a schematic view of a process of manufacturing an integral all-solid state rechargeable battery by preparing a unit in which a positive electrode and an all-solid state electrolyte are integrated and then covering the positive electrode with a negative electrode. A mixed slurry prepared by mixing 75 wt % of a lithium conductive ceramic material $Li_{1.3}Al_{0.3}Ge_{1.7}(PO_4)_3$ (LAGP) with 25 wt % of polyvinylidene fluoride (PVdF) in an N-methyl-2-pyrrolidone (NMP) solvent is applied onto a positive electrode, the NMP solvent is evaporated by heating, and a liquid electrolyte, 1 M $LiPF_6$ in EC/DMC (ethylene carbonate/dimethyl carbonate, 1:1 vol) is absorbed by 20 wt % of the composite film of LAGP and PVdF. Thereafter, the integral all-solid state rechargeable battery is completed by covering the positive electrode with a negative electrode. The thickness of the composite film between the electrodes is 30 μm.

Figure 3:
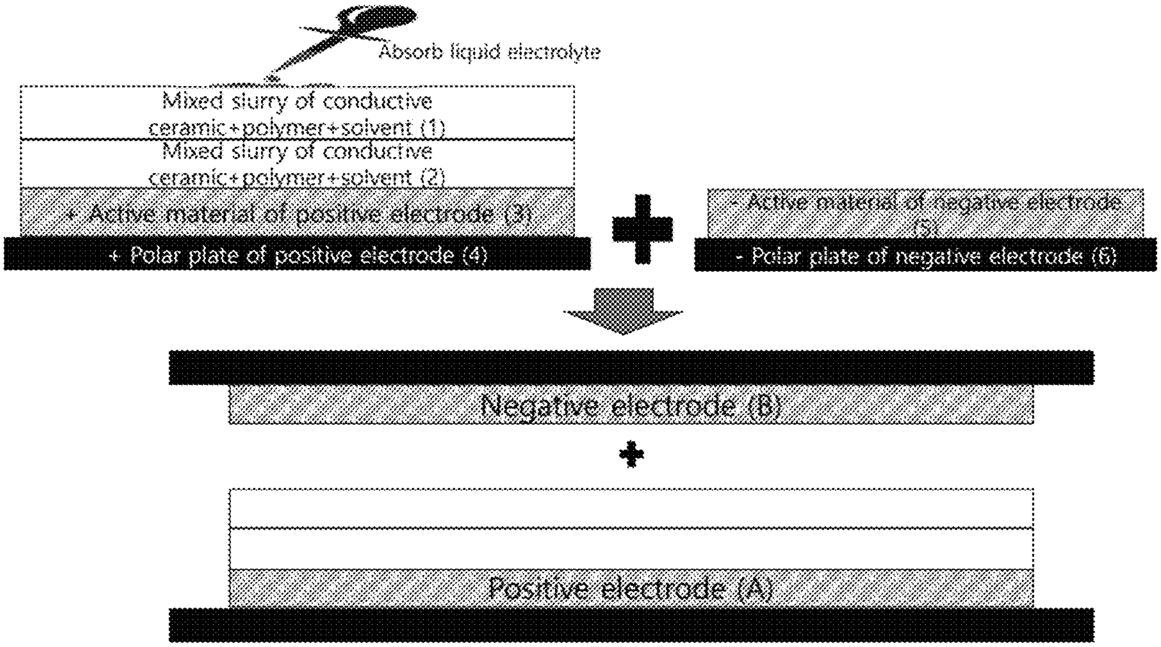
FIG. 3 is a schematic view of an integral all-solid state rechargeable battery manufactured by applying a first mixed slurry containing a conductive ceramic material, a polymer, and a solvent onto a positive electrode, drying the first mixed slurry to remove the solvent, resulting in a first composite film containing the conductive ceramic material and the polymer, applying a second mixed slurry different from the first mixed slurry, containing a conductive ceramic material, a polymer, and a solvent onto the first composite film, drying the second mixed slurry to remove the solvent, resulting in a multilayered composite film that consists of a second composite film containing the conductive ceramic material and the polymer and the first composite film, absorbing a liquid electrolyte in the multilayered composite film, and covering the positive electrode with a negative electrode.

FIG. 3 is a schematic view of a process of manufacturing an integral all-solid state rechargeable battery by preparing a unit in which a positive electrode and a multilayered all-solid state electrolyte are integrated and then covering the positive electrode with a negative electrode. A first mixed slurry prepared by mixing 75 wt % of a lithium conductive ceramic material $Li_{1.3}Al_{0.3}Ti_{1.7}(PO_4)_3$ (LATP) with 25 wt % of a polymer polyvinylidene fluoride (PVdF) in an N-methyl-2-pyrrolidone (NMP) solvent is applied onto a positive electrode and the NMP solvent is evaporated by heating. A second mixed slurry prepared by mixing 75 wt % of a lithium conductive ceramic material $Al_2O_3$ with 25 wt % of a polymer polyvinylidene fluoride (PVdF) in an N-methyl-2-pyrrolidone (NMP) solvent is applied thereon and then the NMP solvent is evaporated by heating again. A liquid electrolyte, 1M $LiPF_6$ in EC/DMC (ethylene carbonate/dimethyl carbonate, 1:1 vol) is absorbed by 20 wt % of a multilayered composite film in which a first composite film of LTAP and PVdF and a second composite film of $Al_2O_3$ and PVdF are laminated. Thereafter, the integral all-solid state rechargeable battery is completed by covering the positive electrode with a negative electrode. The polymers and the solvents used in the first and second slurry may be the same as or different from each other, but the conductive ceramic materials used in the first and second slurry are different from each other. A conductive ceramic material suitable for the positive electrode side is used for the positive electrode side, and a conductive ceramic material suitable for the negative electrode side is used for the negative electrode side. A sum of the thicknesses of two composite films between the electrodes is 80 μm.

Figure 4:
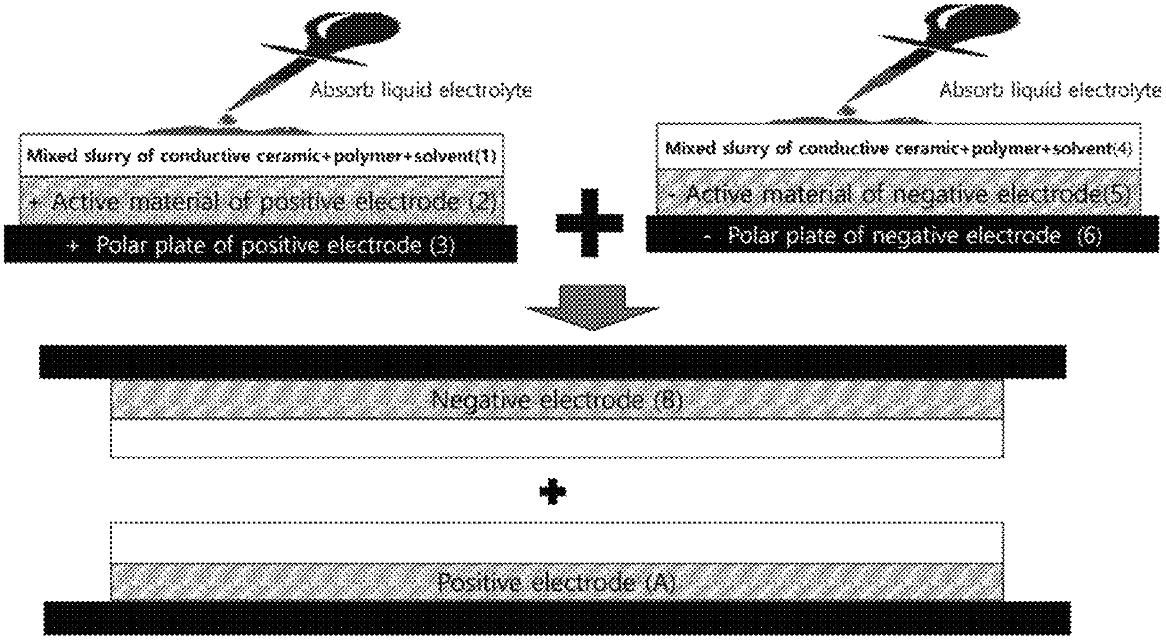
FIG. 4 is a schematic view of an integral all-solid state rechargeable battery manufactured by preparing a positive electrode unit in which a positive electrode and a first solid electrolyte are integrated, preparing a negative electrode unit in which a negative electrode and a second solid electrolyte are integrated, and attaching the positive electrode unit and the negative electrode unit. The positive electrode unit is prepared by applying a first mixed slurry containing a conductive ceramic material, a polymer, and a solvent onto the positive electrode, drying the first mixed slurry to remove the solvent, resulting in a first composite film containing the conductive ceramic material and the polymer, and absorbing a liquid electrolyte in the first composite film. The negative electrode unit is simultaneously or sequentially prepared by applying a second mixed slurry containing a conductive ceramic material, a polymer, and a solvent onto the negative electrode, drying the second mixed slurry to remove the solvent, resulting in a second composite film containing the conductive ceramic material and the polymer, and absorbing a liquid electrolyte in the second composite film.

FIG. 4 is a schematic view of a process of manufacturing an integral all-solid state rechargeable battery by preparing a unit in which a positive electrode and an all-solid state electrolyte are integrated, preparing a unit in which a negative electrode and an all-solid state electrolyte are integrated, and attaching the two units. A mixed slurry prepared by mixing 75 wt % of a lithium conductive ceramic material $Li_{1.3}Al_{0.3}Ti_{1.7}(PO_4)_3$ (LATP) with 25 wt % of a polymer polyvinylidene fluoride (PVdF) in an N-methyl-2-pyrrolidone (NMP) solvent is applied onto a positive electrode and dried to evaporate the solvent completely. A mixed slurry prepared by mixing 75 wt % of a lithium conductive ceramic material $Al_2O_3$ with 25 wt % of a polymer polyvinylidene fluoride (PVdF) in an N-methyl-2-pyrrolidone (NMP) solvent is applied onto a negative electrode and dried to evaporate the solvent completely. A liquid electrolyte, 1 M $LiPF_6$ in EC/DMC (ethylene carbonate/dimethyl carbonate, 1:1 vol) is absorbed by 20 wt % of each composite film on the positive electrode and on the negative electrode. Thereafter, the positive electrode unit and the negative electrode unit are attached to complete the integral all-solid state rechargeable battery. The polymers and the solvents used in the positive electrode slurry may be the same as or different from those used in the negative electrode slurry, but the conductive ceramic materials used in the positive electrode slurry are different from those used in the negative electrode slurry. A conductive ceramic material suitable for the positive electrode is used for the positive electrode slurry, and a conductive ceramic material suitable for the negative electrode is used for the negative electrode slurry. A sum of the thicknesses of two composite films between the electrodes is 80 μm.

Figure 5:
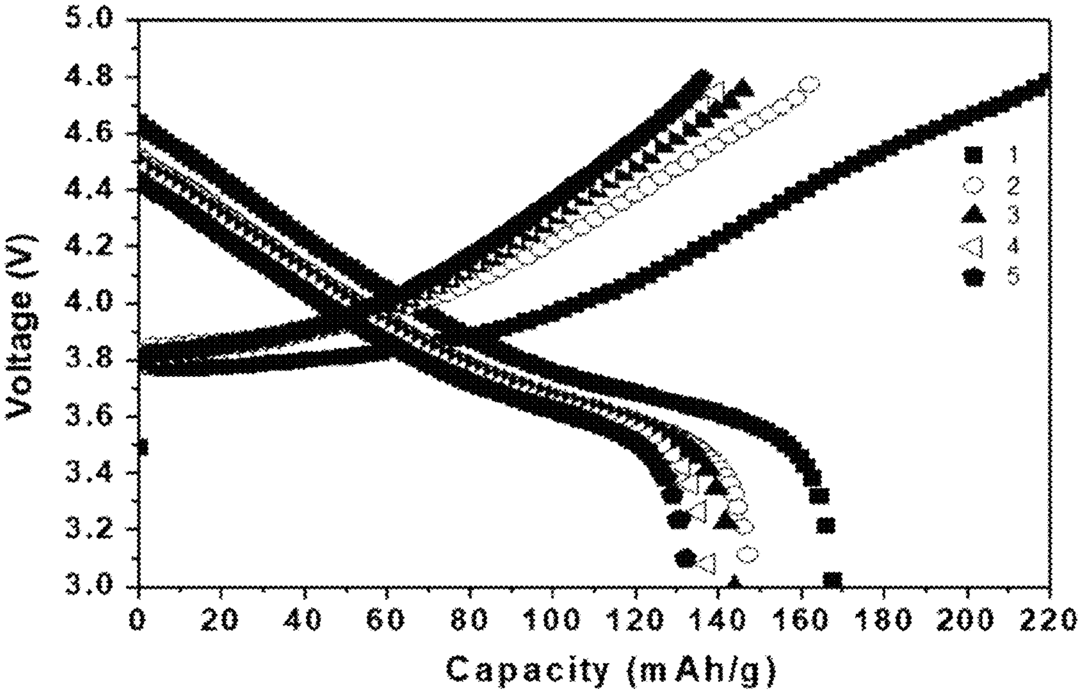
FIG. 5 is a charge-discharge curve of the integral all-solid state rechargeable battery manufactured by the method of FIG. 2.

FIG. 5 is a charge-discharge curve of the integral all-solid state rechargeable battery manufactured by the method of FIG. 2. $LiNi_{0.6}Co_{0.2}Mn_{0.2}O_2$ was used as a positive electrode and graphite was used as a negative electrode. The discharge capacity of 130 mAh/g or more is continuously maintained.

Figure 6:
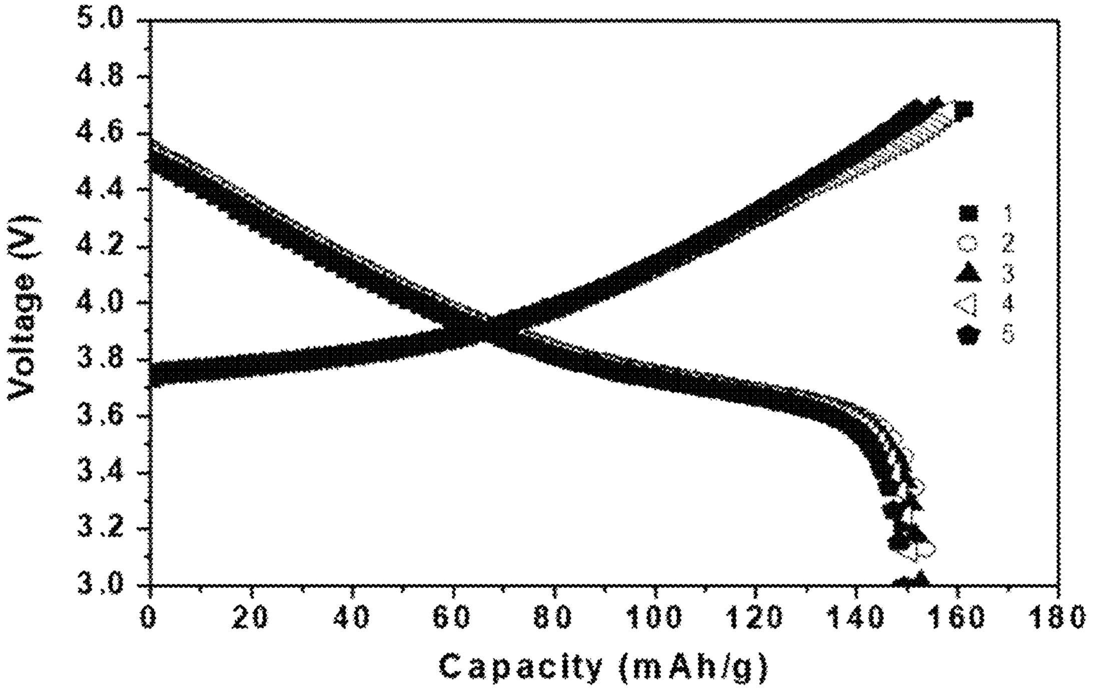
FIG. 6 is a charge-discharge curve of the integral all-solid state rechargeable battery manufactured by the method of FIG. 3.

FIG. 6 is a charge-discharge curve of the integral all-solid state rechargeable battery manufactured by the method of FIG. 3. $LiNi_{0.6}Co_{0.2}Mn_{0.2}O_2$ was used as a positive electrode and graphite was used as a negative electrode. The discharge capacity of 140 mAh/g or more is continuously maintained.

Figure 7:
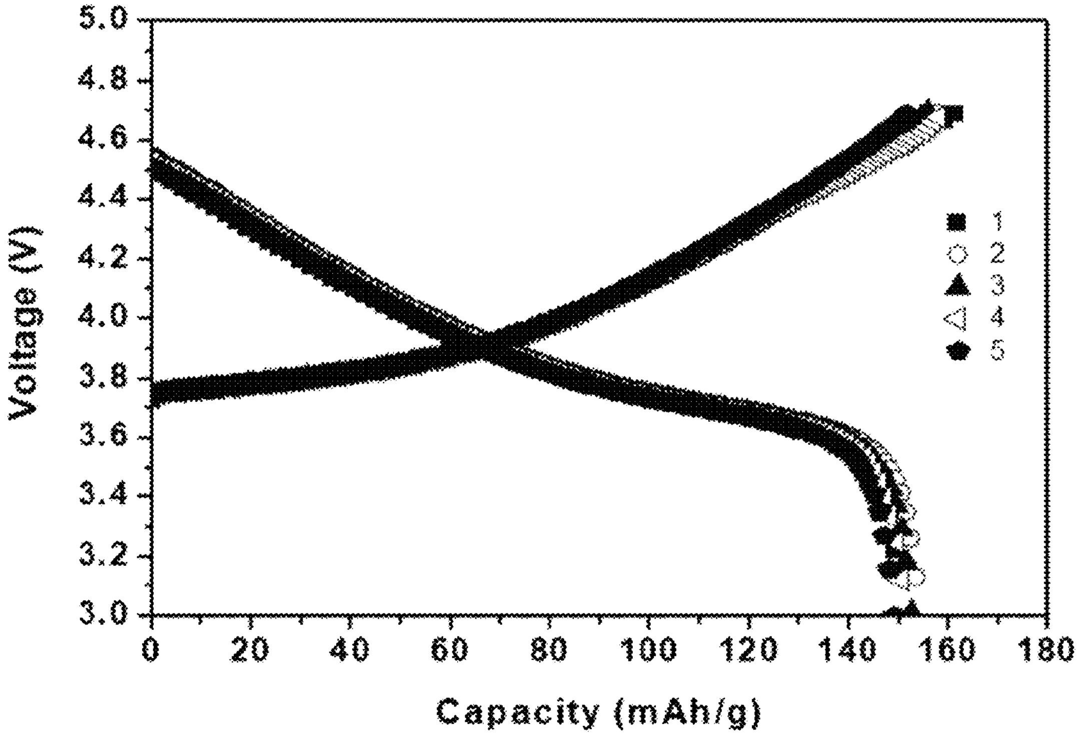
FIG. 7 is a charge-discharge curve of the integral all-solid state rechargeable battery manufactured by the method of FIG. 4.

FIG. 7 is a charge-discharge curve of the integral all-solid state rechargeable battery manufactured by the method of FIG. 4. $LiNi_{0.6}Co_{0.2}Mn_{0.2}O_2$ was used as a positive electrode and graphite was used as a negative electrode. The discharge capacity of 140 mAh/g or more is continuously maintained.

Figure 8:
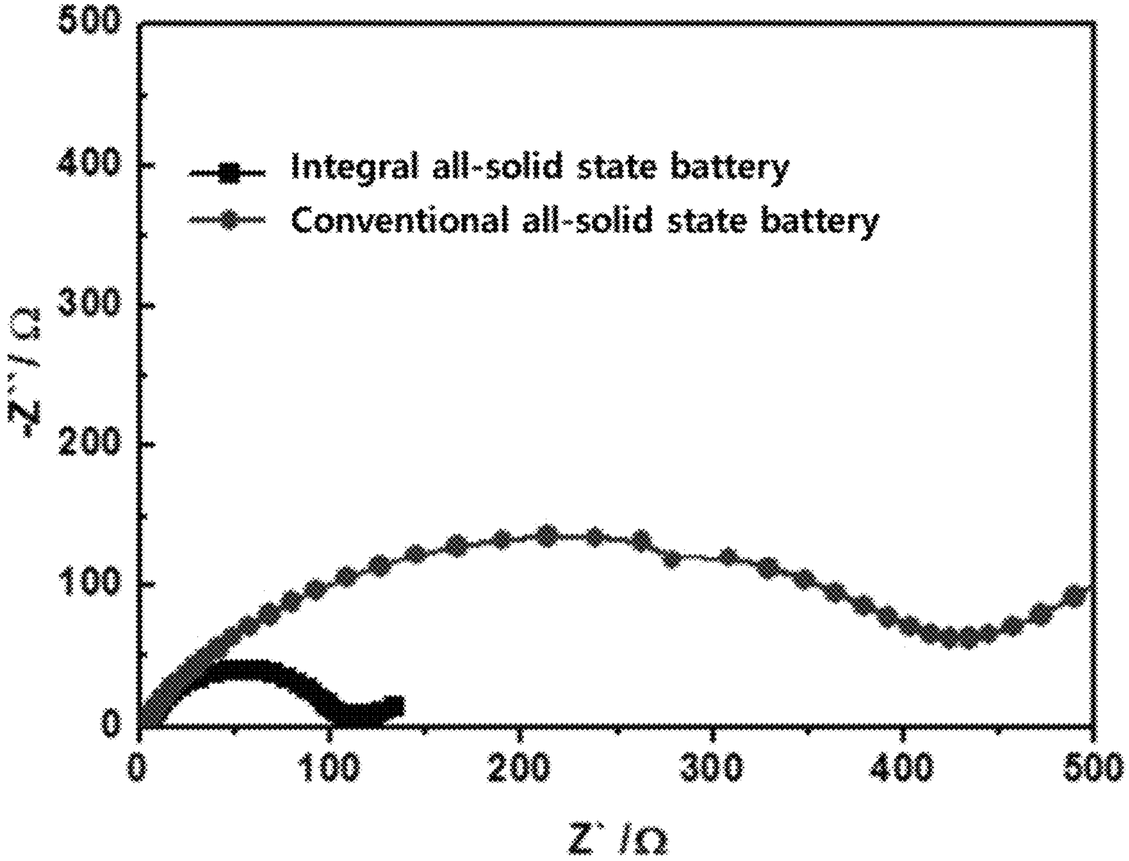
FIG. 8 is a diagram for measuring and comparing cell resistances of the integral all-solid state rechargeable battery manufactured by the method of FIG. 2 and an all-solid state rechargeable battery manufactured by a conventional method using the same materials as FIG. 2.

FIG. 8 is a result of measuring cell resistances of the integral all-solid state rechargeable battery manufactured by the method of FIG. 2 and a rechargeable battery manufactured by a conventional method of separately preparing a positive electrode, a negative electrode, and a solid-state electrolyte and then laminating the positive electrode, the negative electrode, and the solid-state electrolyte (used materials, contents of the materials, and a thickness of the solid-state electrolyte are the same as those of the rechargeable battery prepared in FIG. 2). As illustrated in FIG. 8, the integral all-solid state rechargeable battery has a lower resistance than the conventional rechargeable battery.

The present invention is not limited to the above embodiment, and may be implemented in various other forms.

The invention claimed is:

1. A method for manufacturing an integral solid state rechargeable battery, comprising:

applying a mixed slurry containing 85 wt % to 99 wt % of a conductive ceramic material, 1 wt % to 15 wt % of a polymer when the sum of the conductive ceramic material and the polymer is set to 100 wt %, and a solvent onto an electrode;

drying the mixed slurry to remove the solvent to obtain a composite film containing the conductive ceramic material and the polymer;

absorbing 1 to 5 parts by weight of a liquid electrolyte with respect to 100 parts by weight of the composite film containing the conductive ceramic material and the polymer in the composite film to produce a solid state electrolyte, wherein the liquid electrolyte is prepared by dissolving a lithium salt or a sodium salt in a non-aqueous organic solvent; and covering the electrode with another electrode after absorbing the liquid electrolyte.

2. A method for manufacturing an integral solid state rechargeable battery, comprising:

applying a first mixed slurry containing 85 wt % to 99 wt % of a conductive ceramic material, 1 wt % to 15 wt % of a polymer, and a solvent onto an electrode;

drying the first mixed slurry to remove the solvent to obtain a first composite film containing the conductive ceramic material and the polymer;

applying a second mixed slurry, different from the first mixed slurry, containing 60 wt % to 99 wt % of a conductive ceramic material, 1 wt % to 40 wt % of a polymer, and a solvent onto the first composite film;

drying the second mixed slurry to remove the solvent to obtain a multilayered composite film consisting of the first composite film and a second composite film containing the conductive ceramic material and the polymer; and absorbing 1 to 5 parts by weight of a liquid electrolyte with respect to 100 parts by weight of the multilayered composite film containing the conductive ceramic material and the polymer in the multilayered composite film to produce a solid state electrolyte, wherein the liquid electrolyte is prepared by dissolving a lithium salt or a sodium salt in a non-aqueous organic solvent; and covering the electrode with another electrode after absorbing the liquid electrolyte.

3. A method for manufacturing an integral solid state rechargeable battery, comprising:

preparing a positive electrode unit in which a positive electrode and a first solid electrolyte are integrated;

simultaneously or sequentially preparing a negative electrode unit in which a negative electrode and a second solid electrolyte are integrated; and attaching the positive electrode unit and the negative electrode unit, wherein the positive electrode unit is prepared through steps comprising:

applying a first mixed slurry containing 85 wt % to 99 wt % of a conductive ceramic material, 1 wt % to 15 wt % of a polymer, and a solvent onto the positive electrode;

drying the first mixed slurry to remove the solvent to obtain a first composite film containing the conductive ceramic material and the polymer; and absorbing 1 to 5 parts by weight of a liquid electrolyte with respect to 100 parts by weight of the first composite film containing the conductive ceramic material and the polymer in the first composite film to produce a solid state electrolyte, wherein the liquid electrolyte is prepared by dissolving a lithium salt or a sodium salt in a non-aqueous organic solvent, wherein the negative electrode unit is prepared through steps comprising:

applying a second mixed slurry containing 85 wt % to 99 wt % of a conductive ceramic material, 1 wt % to 15 wt % of a polymer, and a solvent onto the negative electrode;

drying the second mixed slurry to remove the solvent to obtain a second composite film containing the conductive ceramic material and the polymer; and absorbing 1 to 5 parts by weight of a liquid electrolyte with respect to 100 parts by weight of the second composite film containing the conductive ceramic material and the polymer in the second composite film to produce another solid state electrolyte, wherein the liquid electrolyte is prepared by dissolving a lithium salt or a sodium salt in a non-aqueous organic solvent, wherein the attaching step of the positive electrode unit and the negative electrode unit is performed after the absorbing step of the preparation of the positive electrode unit and the absorbing step of the preparation of the negative electrode unit.

4. The method for manufacturing the integral solid state rechargeable battery according to claim 2, wherein the multilayered composite film further includes another composite film in addition to the first composite film and the second composite film.

5. The method for manufacturing the integral solid state rechargeable battery according to claim 3, wherein one or both of the positive electrode unit and the negative electrode unit further includes another composite film in addition to the first composite film and the second composite film.

6. The method for manufacturing the integral solid state rechargeable battery according to claim 1, wherein the solvent used in the mixed slurry containing the conductive ceramic material, the polymer, and the solvent is N-methyl-2-pyrrolidone (NMP)-based one or derivative thereof, acetone-based one or derivative thereof, alcohol-based one or derivative thereof, methanol-based one or derivative thereof, dimethylacetamide (DMAc)-based one or derivative thereof, tetrahydrofuran (THF)-based one or derivative thereof, dimethylformamide (DMF)-based one or derivative thereof, distilled water, or a mixture thereof.

7. The method for manufacturing the integral solid state rechargeable battery according to claim 1, wherein the non-aqueous organic solvent is carbonate-based one, ester-based one, ether-based one, ketone-based one, alcohol-based one, aprotic solvent, or a combination thereof.

8. The method for manufacturing the integral solid state rechargeable battery according to claim 1, wherein the conductive ceramic material is lithium oxide-based one, lithium sulfide-based one, lithium phosphate-based one, amorphous ionic conductive material, NASICON, sodium sulfide-based one, or sodium oxide-based one.

9. The method for manufacturing the integral solid state rechargeable battery according to claim 8, wherein the lithium oxide-based conductive ceramic material is Li-β-$Al_2O_3$, Li—$TiO_2$, Li—$BaTiO_3$, Li—$SiO_2$, $(La,Li)TiO_3$ (LLTO) ((La, Li)=La or Li), $Li_5La_3Ta_2O_{12}$, $Li_6La_2CaTa_2O_{12}$, $Li_4SiO_4$ $Li_3BO_{2.5}N_{0.5}$, $Li_9SiAlO_8$, $Li_5La_2ANb_2O_{12}$ (A=Ca or Sr), $Li_2Nd_3$ $TeSbO_{12}$, $Li_7La_3Zr_2O_{12}$ (LLZO), $Li_5La_3Ta_2O_{12}$, or $Li_9SiAlO_8$.

10. The method for manufacturing the integral solid state rechargeable battery according to claim 8, wherein the lithium sulfide-based conductive ceramic material is $Li_{10}GeP_2S_{12}$, $Li_7P_2S_{11}$, $Li_{3.25}Ge_{0.25}P_{0.75}S_4$ (LGPS), $Li_2S$—

$Si_2S_5$, $Li_2S—Ga_2S_3—GeS_2$, $Li_2S—Sb_2S_3—GeS_2$, $Li_2S—P_2S_5$, $Li_2S—P_2S_5—Li_4SiO_4$, or $Li_{3.25}—Ge_{0.25}—P_{0.75}S_4$ (Thio- LISICON).

11. The method for manufacturing the integral solid state rechargeable battery according to claim 8, wherein the lithium phosphate-based conductive ceramic material is LAGP ($Li_{1+x}Al_xGe_{2-x}(PO_4)_3$) ($0<x<2$), LTAP ($Li_{1+x}Ti_{2-x}Al_x(PO_4)_3$) ($0<x<2$), $Li_{1+x}Ti_{2-x}Al_xSi_y(PO_4)_{3-y}$ ($0<x<2$, $0<y<3$), $LiAl_xZr_{2-x}(PO_4)_3$ ($0<x<2$), or $LiTi_xZr_{2-x}(PO_4)_3$ ($0<x<2$).

12. The method for manufacturing the integral solid state rechargeable battery according to claim 8, wherein the amorphous ionic conductive material is phosphorous-based glass, oxide-based glass, or oxide-sulfide based glass.

13. The method for manufacturing the integral solid state rechargeable battery according to claim 8, wherein the sodium oxide-based conductive ceramic material is Na3Zr2Si2PO12.

14. The method for manufacturing the integral solid state rechargeable battery according to claim 1, wherein the polymer is polyvinylidene fluoride (PVdF)-based one or copolymer thereof, poly [(vinylidene fluoride-co-trifluoroethylene]-based one or copolymer thereof, polyethylene glycol (PEO)-based one or copolymer thereof, polyacrylonitrile (PAN)-based one or copolymer thereof, poly(methylmethacrylate) (PMMA)-based one or copolymer thereof, polyvinyl chloride-based one or copolymer thereof, polyvinylpyrrolidone (PVP)-based one or copolymer thereof, polyimide (PI)-based one or copolymer thereof, polyethylene (PE)-based one or copolymer thereof, polyurethane (PU)-based one or copolymer thereof, polypropylene (PP)-based one or copolymer thereof, poly (propylene oxide) (PPO)-based one or copolymer thereof, poly (ethyleneimine) (PEI)-based one or copolymer thereof, poly (ethylene sulfide) (PES)-based one or copolymer thereof, poly (vinyl acetate) (PVAc)-based one or copolymer thereof, poly (ethylene succinate) (PESc)-based one or copolymer thereof, polyester-based one or copolymer thereof, polyamine-based one or copolymer thereof, polysulfide-based one or copolymer thereof, siloxane-based one or copolymer thereof, styrene-butadiene rubber (SBR)-based one or copolymer thereof, carboxymethylcellulose (CMC)-based one or copolymer thereof, a derivative thereof, or a combination thereof.

15. The method for manufacturing the integral solid state rechargeable battery according to claim 1, wherein the drying step of the mixed slurry is performed after the applying step, and the absorbing step is performed after the drying step.

* * * * *